(12) United States Patent
Hagleitner

(10) Patent No.: US 10,900,600 B2
(45) Date of Patent: Jan. 26, 2021

(54) COUPLING DEVICE WITH INTEGRATED STOPCOCK AND DEVICE FOR SUPPLYING A FLOWABLE SUBSTANCE

(71) Applicant: Hans Georg Hagleitner, Zell am See (AT)

(72) Inventor: Hans Georg Hagleitner, Zell am See (AT)

(*) Notice: Subject to any disclaimer, the term of this patent is extended or adjusted under 35 U.S.C. 154(b) by 0 days.

(21) Appl. No.: 16/379,856

(22) Filed: Apr. 10, 2019

(65) Prior Publication Data

US 2019/0234549 A1 Aug. 1, 2019

Related U.S. Application Data

(63) Continuation of application No. PCT/AT2017/060246, filed on Oct. 2, 2017.

(30) Foreign Application Priority Data

Oct. 11, 2016 (AT) .............................. A 50917/2016

(51) Int. Cl.
*F16L 37/47* (2006.01)
*F16L 37/256* (2006.01)
*F16L 37/56* (2006.01)

(52) U.S. Cl.
CPC ............. *F16L 37/47* (2013.01); *F16L 37/256* (2013.01); *F16L 37/56* (2013.01)

(58) Field of Classification Search
CPC ......... F16K 31/58; F16L 37/47; F16L 37/256; F16L 37/56; Y10T 137/86163; Y10T 137/86558; Y10T 137/86566; Y10T 137/87153

USPC .......................................................... 251/148
See application file for complete search history.

(56) References Cited

U.S. PATENT DOCUMENTS

| 2,493,271 | A | * | 1/1950 | Shane | ..................... F16L 37/47 |
| | | | | | 251/149 |
| 4,357,952 | A | | 11/1982 | Knecht | |
| 4,589,445 | A | | 5/1986 | Sanchez Aguilar et al. | |
| 5,050,841 | A | * | 9/1991 | Jacobsson | ............... F16L 37/47 |
| | | | | | 251/149.9 |

(Continued)

FOREIGN PATENT DOCUMENTS

| DE | 378601 C | 7/1923 |
| DE | 1078827 B | 3/1960 |

(Continued)

*Primary Examiner* — Umashankar Venkatesan
*Assistant Examiner* — Andrew J Rost
(74) *Attorney, Agent, or Firm* — Laurence A. Greenberg; Werner H. Stemer; Ralph E. Locher

(57) ABSTRACT

A coupling device having an integrated stopcock for placement in a flow connection between a first line and a second line includes a carrier body having a connection for the second line, a plug part having a connection for the first line, and a rotary part being rotatable by the plug part, disposed in the carrier body between the connections and having an opening. The two connections are connected for flow through the opening in a rotated end position of the rotary part. A plug-and-rotate lock is formed between the plug part and the carrier body. The plug part is detachably plugged into the rotary part and can be rotated in the carrier body together with the rotary part. A device for supplying a flowable substance from a container to a discharge point is also provided.

9 Claims, 4 Drawing Sheets

(56) References Cited

U.S. PATENT DOCUMENTS

| | | | |
|---|---|---|---|
| 5,144,984 A | | 9/1992 | Westerberg et al. |
| 5,427,145 A | | 6/1995 | Grabenkort |
| 5,562,273 A | | 10/1996 | Wuethrich |
| 5,681,027 A | * | 10/1997 | Wuethrich ............... F16L 37/47 251/149.2 |
| 6,899,132 B2 | * | 5/2005 | Mikiya ................... F16K 5/061 137/616.7 |
| 7,320,484 B2 | * | 1/2008 | Wuthrich ................ F16L 37/47 251/148 |
| 7,588,230 B2 | | 9/2009 | Meier et al. |
| 9,581,273 B2 | * | 2/2017 | Taguchi ................ F16L 37/407 |

FOREIGN PATENT DOCUMENTS

| | | |
|---|---|---|
| EP | 0327494 A1 | 8/1989 |
| EP | 0448954 A1 | 10/1991 |
| GB | 575539 A | 2/1946 |
| GB | 998004 A | 7/1965 |
| GB | 2285496 A | 7/1995 |
| WO | 9622804 A1 | 8/1996 |
| WO | 2005075868 A2 | 8/2005 |

* cited by examiner

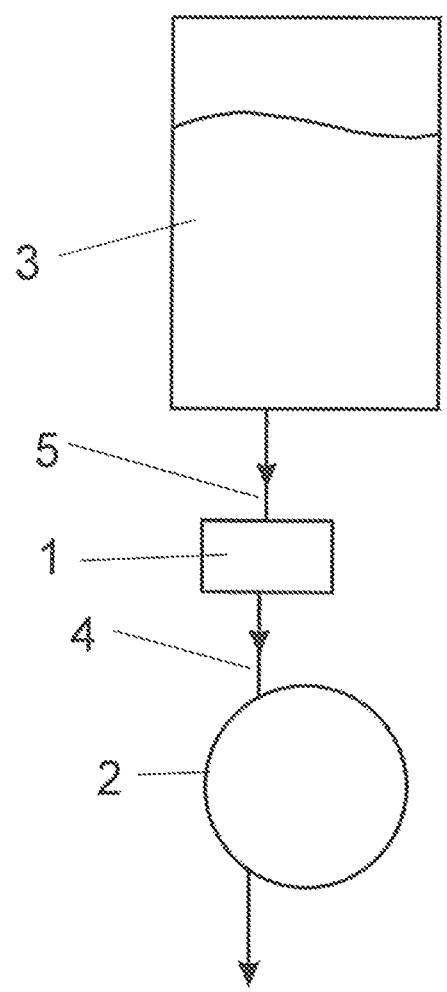

US 10,900,600 B2

COUPLING DEVICE WITH INTEGRATED STOPCOCK AND DEVICE FOR SUPPLYING A FLOWABLE SUBSTANCE

CROSS-REFERENCE TO RELATED APPLICATION

This is a continuation application, under 35 U.S.C. § 120, of copending International Application PCT/AT2017/060246, filed Oct. 2, 2017, which designated the United States; this application also claims the priority, under 35 U.S.C. § 119, of Austrian Patent Application AT A 50917/2016, filed Oct. 11, 2016; the prior applications are herewith incorporated by reference in their entirety.

BACKGROUND OF THE INVENTION

Field of the Invention

The invention relates to a coupling device with an integrated stopcock for placement in a flow connection between a first line and a second line, including a carrier body having a connection for the second line, a plug part having a connection for the first line, and a rotary part disposed in the carrier body between the connections and having an opening being rotatable by the plug part, the two connections being connected for flow through the opening when the rotary part is in its rotated end position. The invention also relates to devices for supplying a flowable substance from a source or a reservoir to a discharge point, having a flow connection that connects a storage container and the discharge point and may be disconnected and shut off.

Hose couplings with a spring-loaded, self-closing insert, which is pressed onto a water fitting by the insertion of the water hose and closes when the water hose is removed, are known chiefly from irrigation systems, so that at least temporarily there is no need to shut off the water fitting.

German Patent DE 1 078 827 B discloses a coupling or connecting device of the above-described type for devices through which fluids flow, which is formed of a socket mounted, for example, fixedly on a wall and connected to a fresh water inflow and an outflow line, and a coupling plug provided with two hoses. That connection device may be used, for example, to easily connect a portable or mobile water-consuming apparatus to the water and wastewater installation. The fresh water inflow is provided with a rotatable tap plug in the socket, the rotation of which is caused by the linear insertion and extraction movement of the coupling plug, which engages in a swivel lever connected to the tap plug. The wastewater outflow is blocked by a standard check valve, which the coupling plug presses open when inserted.

Such a coupling device with an integrated stopcock for connecting at least a first line to a second line, capable of being operated with one hand, may also be advantageous in other applications, for example to easily replace a feed pump in a device for admixing concentrated chemicals with water, in manufacturing diluted detergents, disinfectants, etc., where it must be ensured that the concentrated substance cannot escape. That means that at least the disconnection of the outflow from the chemical tank from the inlet of the feed pump must be as drip-free as possible and, in a preferred embodiment, the disconnection of the outlet of the feed pump from the consumer, for example at the admixing or metering point, must also be drip-free.

SUMMARY OF THE INVENTION

It is accordingly an object of the invention to provide a coupling device with an integrated stopcock and a device for supplying a flowable substance, which overcome the hereinafore-mentioned disadvantages of the heretofore-known devices of this general type, in which a plug-and-rotate lock is furnished between the plug part and the carrier body, and the plug part is detachably inserted into the rotary part and may be rotated together with the rotary part in the carrier body.

The "socket" of this coupling device thus likewise includes the carrier body and the rotary part rotatably mounted therein as a "tap plug." However, in contrast to the prior art, the plug part is inserted radially to the axis of rotation of the rotary part. In this position, the rotary part covers the line connection of the carrier body.

After inserting the plug part into the rotary part, the two parts may be swiveled together about the axis of rotation of the rotary part up to the end stop, with the plug part connecting to the carrier body and preferably making a connection in the form of a bayonet joint. The passage between the connection for the line on the plug part and the connection for the second line on the carrier body preferably opens only in the last section of the swivel, because the opening in the rotary part that aligns with the connection on the plug part swivels inward under the connection with the carrier body. The swivel angle is 60° in particular. In this phase, the plug part may only be removed by reverse rotation, again shutting off the connection to the carrier body.

In a preferred embodiment, the carrier body has a hollow cylindrical shape with a lateral cut-out opposite the connection for the second line. The term "hollow cylindrical" refers to the shape of the hollow space. The outer shape may differ from that of a cylinder and will depend on the particular application or installation. In the case of a hollow cylinder, the lateral cut-out is a window in the cylinder jacket and the connection for the second line is likewise disposed diagonally opposite it inside the cylinder jacket.

In another preferred embodiment, the rotary part is cylindrical and has both a receiving space for the plug part that is accessible through the cut-out of the carrier body, and a through hole associated with the plug-and-rotate lock. The through hole of the rotary part, in this case, is next to the opening for the flow connection between the two connections. In this way, according to the invention, the plug part is inserted through the lateral cut-out of the carrier body into the receiving space of the rotary part.

In a preferred embodiment, the plug-and-rotate lock has a slot in the carrier body and a bolt protruding from the plug part, and the bolt engages behind the slot of the carrier body through the through hole in the rotary part. The inverse is also conceivable, namely a bolt with a wider head that projects inwards from the carrier body, with the plug part having an undercut groove into which the bolt head may be swiveled. In this embodiment, the through hole of the rotary part is also formed by a slot.

For simple one-handed operation of the coupling device, it is also preferred that the plug part has an operating handle on the side opposite the bolt.

In the above-described use of the coupling device in chemical transport lines, particularly near a feed pump, a preferred embodiment provides a double coupling, so that not only the inlet but also the outlet of the pump may be shut off and disconnected. According to the invention, this double coupling may be achieved in a simple way by the fact that the hollow cylindrical carrier body has two connections for the second lines, and the plug part has two connections for the hoses, with the plug-and-rotate lock being realized centrally between the connections.

Due to the plug-and-rotate lock between the plug part and the carrier body, it is also possible to produce tri-coupling or multi-coupling devices that have connections disposed side by side in series.

With the objects of the invention in view there are concomitantly provided devices including a coupling device according to one of the above-described embodiments disposed in a flow connection between a source or a reservoir and a discharge point, and a plug-and-rotate lock provided between the plug part and the carrier body.

Other features which are considered as characteristic for the invention are set forth in the appended claims.

Although the invention is illustrated and described herein as embodied in a coupling device with an integrated stopcock and a device for supplying a flowable substance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 7 is a front-elevational view of the configuration of the embodiment of FIG. 6.

DETAILED DESCRIPTION OF THE INVENTION

Figure 1:
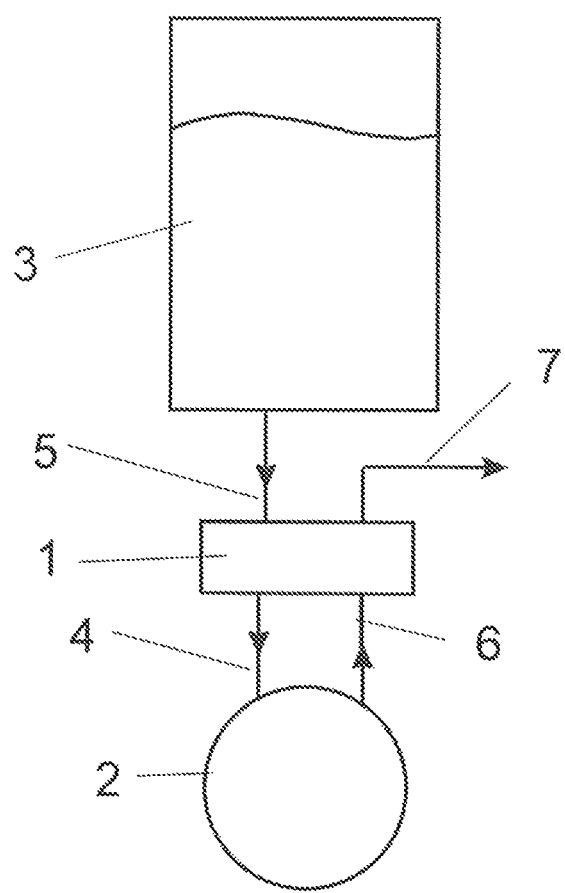
FIG. 1 is a diagrammatic, front-elevational view of a configuration of a preferred embodiment of a coupling device according to the invention.

Referring now to the figures of the drawings in detail and first, particularly, to FIG. 1 thereof, there is seen a diagrammatic illustration of a source or a reservoir with a container 3 from which a line 5 leads downwards. The line 5 is fixed or flexible and is connected to a coupling device 1. A line 4, in particular a hose, leads from the coupling device 1 to an inlet of a pump 2. A line 6, in particular another hose, leads back from an outlet of the pump 2 to the coupling device 1. A line 7, which may likewise be fixed or flexible, goes from the coupling device 1 to a discharge point, for example a dosing or mixing device for diluted detergent, disinfectant or the like. After prolonged use, it may be necessary to replace or service the pump 2 and the pump must accordingly be removed from the sequence. Particularly if the container 3 contains valuable, toxic or corrosive contents, the substance should not leak or be able to escape when the pump 2 is removed.

Figure 2:
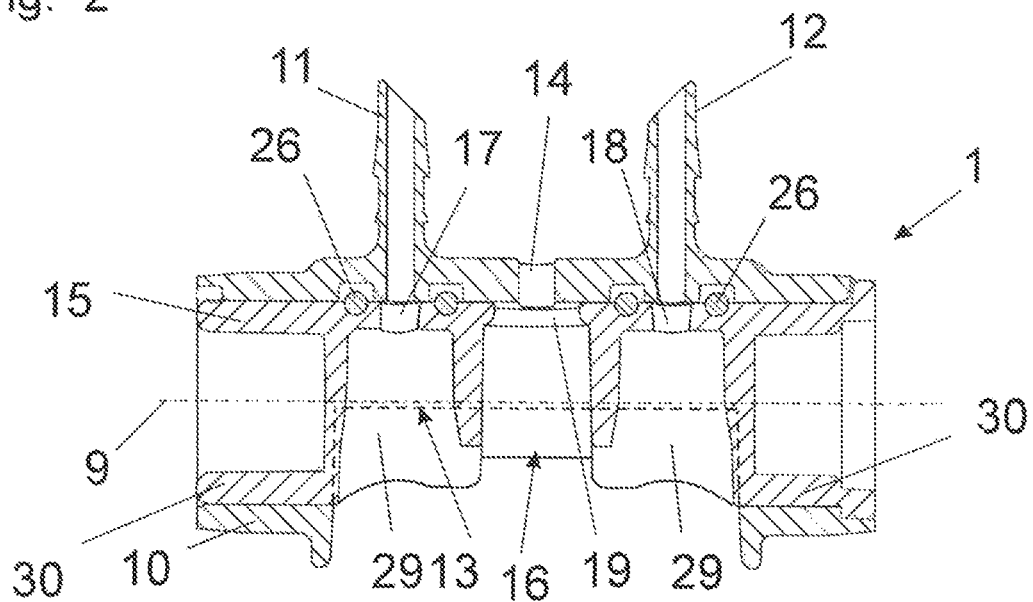
FIG. 2 is an enlarged, fragmentary, longitudinal-sectional view through a part of the coupling device.
Figure 3:
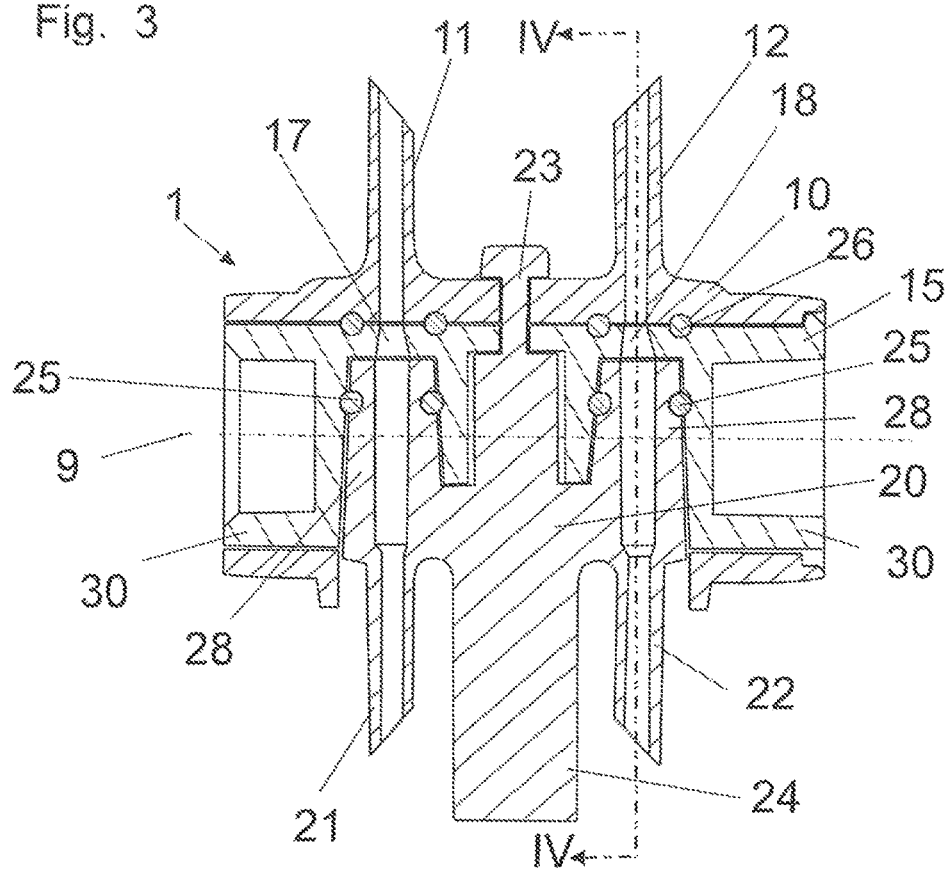
FIG. 3 is a longitudinal-sectional view through the coupling device with opened flow connections.
Figure 4:
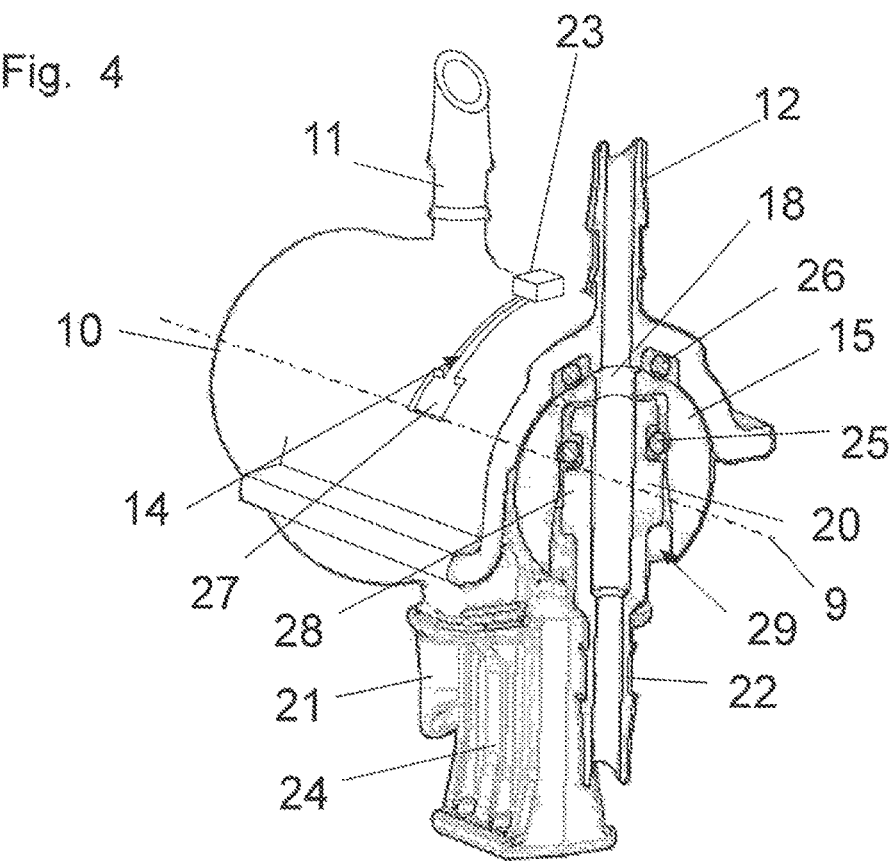
FIG. 4 is a perspective view of a section taken along a line IV-IV of FIG. 3, in the direction of the arrows.
Figure 5:
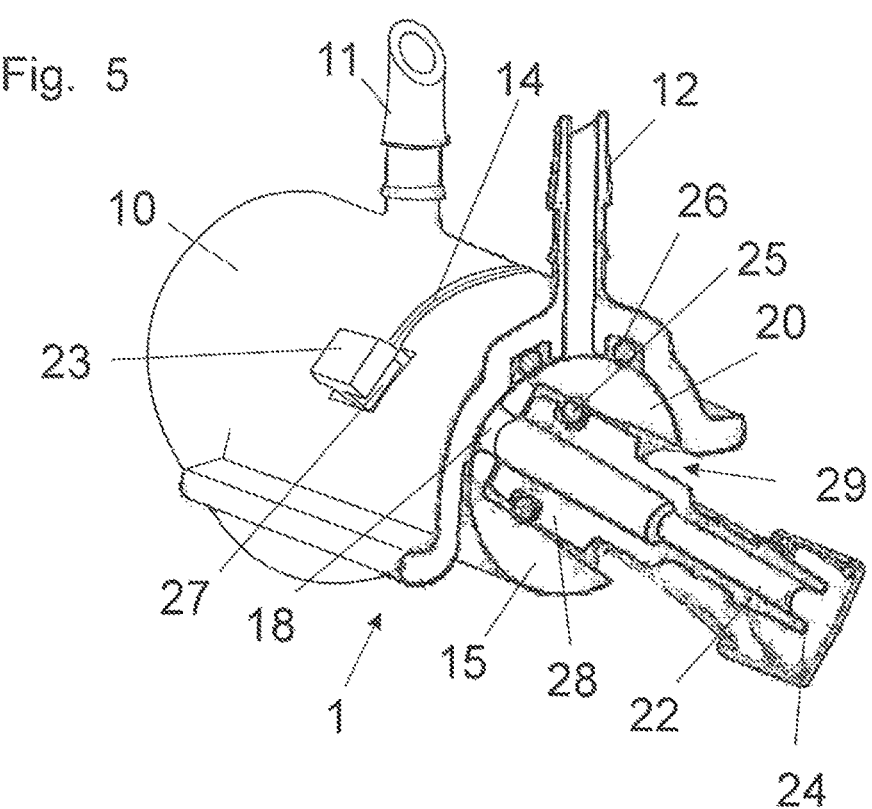
FIG. 5 is a perspective view of a section according to FIG. 4 through the coupling device that has been closed.

The coupling device 1 is shown in longitudinal sections in FIGS. 2 and 3 and it is shown in detail in cross sections in FIGS. 4 and 5. The coupling device 1 substantially includes three parts, namely a carrier body 10 with two connections 11 and 12 for the lines 5 and 7, a plug part 20 with two connections 21, 22 for the lines 4 and 6, and a rotary part 15 which is disposed between the parts 10 and 20 and functions as a stopcock for the flow connections. In particular, the carrier body 10 is disposed to be stationary so that the lines 5 and 7 may be fixed or flexible, as mentioned above. These lines are subsequently referred to as second lines and are not defined in any greater detail.

The carrier body 10 has a hollow cylindrical interior which has a central cut-out 13 that extends approximately 180° with respect to an axis 9 of the carrier body 10 (shown by the dashed line in FIG. 2), so that bearing bushings remain in place on both sides, for a rotatable bearing of the rotary part 15.

The rotary part 15 has bearing rings 30 on both sides and is centrally furnished with a receiving space 16 located inside the cut-out 13 of the carrier body 10. This makes the receiving space 16 of the rotary part 15 accessible through the cut-out 13 and suitable for accommodating the plug part 20.

The carrier body 10 has the connections 11, 12 which are opposite the cut-out 13 and are connected to the second lines 5, 7. An O-ring 26 is inserted around each connection 11, 12 between the carrier body 10 and the rotary part 15. In the rotary part 15, starting from the receiving space 16, there are furnished a first opening 17, a through hole 19 and a second opening 18. In the position of the rotary part 15 shown in FIGS. 2 and 3, the flow connection has been opened. In other words, the rotary part 15 is in a position in which opening 17 is aligned with the connection 11 and the opening 18 is aligned with the connection 12. The through hole 19, which is part of a plug-and-rotate lock between the carrier body 10 and the plug part 20, is located in a slot 14 that runs in the circumferential direction in the carrier body 10 and will be discussed in greater detail below.

As is shown in greater detail in FIGS. 3 and 5, the plug part 20 is inserted into the receiving space 16 of the rotary part 15. The two connections 21, 22 for connection to the first lines 4 and 6 of FIG. 1 are furnished next to each other on the plug part 20, with each connection 21, 22 terminating in a plug socket 28 that is inserted into a corresponding conical recess 29 of the receiving space 16 and sealed by using an O-ring 25. As FIG. 3 shows, in this position the connections 11, 21 are connected for flow through the opening 17 and the connections 12, 22 are connected for flow through the opening 18. An operating handle 24 is provided centrally between the connections 21, 22 on plug part 20, and may be used to rotate the rotary part 15 in order to interrupt the flow connections. FIG. 5 depicts the interrupted position. The open position, as mentioned, is shown in FIGS. 3 and 4. Since the plug part 20 is inserted into the rotary part 15 and rotated together with the rotary part 15, the first lines 4, 6 are constructed to be flexible, and in particular are constructed as hoses made of a suitable material for transporting the substance.

The coupling device 1 has a plug-and-rotate lock between the carrier body 10 and the plug part 20, which also includes the through hole 19 of the rotary part 15 and the slot 14 in the carrier body 10. At the plug part 20, a bolt 23 with a widened head is provided opposite or in an extension of the operating handle 24, and the slot 14 ends on one side in an extension 27 that at least corresponds to the widened head of the bolt 23. The plug-and-rotate lock is in the form of a bayonet joint, i.e. the plug part 20 is inserted into the rotary part 15 when the same is in its locked position, and the head of the bolt 23 passes through the through hole 19 of the rotary part 15 and the extension 27 of the slot 14. The plug part 20 may now be swiveled together with the rotary part 15 from the position of FIG. 5 to the position of FIG. 4, with the bolt 23 entering the slot 14 and fixing the rotary part 15 in place at the end of the slot. This is the position shown in FIGS. 3 and 4, in which the flow connections are open but the plug part 20 cannot be pulled out. If it desired to disconnect the coupling device 1, a reverse swivel back to the position of FIG. 5 is necessary, and the flow connections will then close. The plug part 20 may be pulled out in this case, because the widened head of the bolt 23 may again emerge from the extension 27 and the through hole 19 of the rotary part 15.

Figure 6:
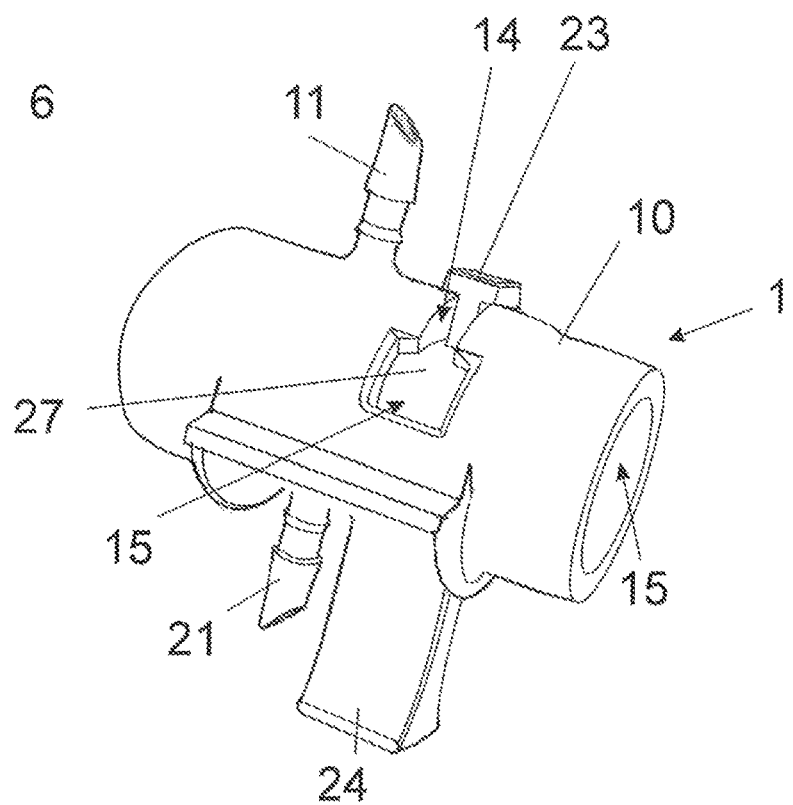
FIG. 6 is a perspective view of a second embodiment of the coupling device.

FIG. 6 shows a simple embodiment which, according to the same principle, establishes or interrupts only one flow connection between a connection 11 and the connection 21. However, the second pair of connections on the other side of the plug-and-rotate lock is absent. FIG. 7 again diagrammatically depicts a source or a reservoir with a container 3 similar to FIG. 1 and with a flow connection to a discharge point. A simple coupling device 1 according to FIG. 6 with a plug-and-rotate lock is disposed in the flow connection. Thus, in this embodiment as well, the second line 5 may be disconnected from the first line 4.

The coupling device 1 may be operated with one hand, and coupling devices may also be manufactured in the same way, having symmetrical or asymmetrical connection pairs in addition to the plug-and-rotate lock, for example 2/1 connection pairs for three flow connections or 2/2 connection pairs for four flow connections.

The invention claimed is:

1. A coupling device with an integrated stopcock for placement in a flow connection between a first line and a second line, the coupling device comprising:
   a carrier body having a hollow cylindrical shape, a connection for the second line, and a lateral cut-out opposite said connection for the second line;
   a plug part having a connection for the first line;
   a cylindrical rotary part disposed in said carrier body between said connections, said rotary part having an opening and being rotatable by using said plug part;
   said connections being connected for flow through said opening in a rotated end position of said rotary part; and
   a plug-and-rotate lock formed between said plug part and said carrier body;
   said plug part being detachably inserted into said rotary part and being rotatable together with said rotary part in said carrier body;
   said rotary part having a receiving space for said plug part being accessible through said cut-out of said carrier body, and said rotary part having a through hole associated with said plug-and-rotate lock;
   said plug-and-rotate lock having a slot formed in said carrier body and a bolt projecting from said plug part and engaging behind said slot of said carrier body through the through hole in said rotary part.

2. The coupling device according to claim 1, wherein said plug part is inserted into said receiving space of said rotary part through said lateral cut-out of said carrier body.

3. The coupling device according to claim 1, wherein said slot starts from an extension having a clear width corresponding at least to said bolt of said plug part.

4. The coupling device according to claim 3, wherein said plug part has an operating handle on a side opposite said bolt.

5. The coupling device according to claim 1, wherein:
   the first line is one of two first lines and the second line is one of two second lines configured for a flow connection therebetween;
   said carrier body has a hollow cylindrical shape and two connections for the two second lines;
   said plug part has two connections for the two first lines; and
   said plug-and-rotate lock is formed centrally between said connections.

6. A device for supplying a flowable substance from a container to a discharge point, the device comprising:
   a flow connection between the container and the discharge point, said flow connection being configured to be disconnected and shut off;
   a pump disposed upstream of the discharge point; and
   a coupling device according to claim 5 disposed in said flow connection.

7. The device according to claim 6, wherein each of the first line and the second line is a flexible hose.

8. A device for supplying a flowable substance from a container to a discharge point, the device comprising:
   a flow connection between the container and the discharge point, said flow connection being configured to be disconnected and shut off; and
   a coupling device according to claim 1 disposed in said flow connection.

9. The device according to claim 8, wherein each of the first line and the second line is a flexible hose.

\* \* \* \* \*